United States Patent
Ingram et al.

(10) Patent No.: US 10,525,404 B2
(45) Date of Patent: Jan. 7, 2020

(54) USE OF MORPHOLINE-BASED HINDERED AMINE COMPOUNDS FOR SELECTIVE REMOVAL OF HYDROGEN SULFIDE

(71) Applicants: BASF SE, Ludwigshafen am Rhein (DE); ExxonMobil Research and Engineering Company, Fairfax, VA (US)

(72) Inventors: Thomas Ingram, Ludwigshafen am Rhein (DE); Gerald Vorberg, Ludwigshafen am Rhein (DE); Martin Ernst, Ludwigshafen am Rhein (DE); Carla Pereira, Bridgewater, NJ (US); Michael Siskin, Westfield, NJ (US)

(73) Assignees: BASF SE, Ludwigshafen Am Rhein (DE); ExxonMobil Research and Engineering Company, East Annandale, NJ (US)

(*) Notice: Subject to any disclaimer, the term of this patent is extended or adjusted under 35 U.S.C. 154(b) by 0 days.

(21) Appl. No.: 16/095,970

(22) PCT Filed: Apr. 5, 2017

(86) PCT No.: PCT/EP2017/058122
§ 371 (c)(1),
(2) Date: Oct. 24, 2018

(87) PCT Pub. No.: WO2017/186466
PCT Pub. Date: Nov. 2, 2017

(65) Prior Publication Data
US 2019/0143262 A1 May 16, 2019

(30) Foreign Application Priority Data
Apr. 25, 2016 (EP) .................... 16166787

(51) Int. Cl.
*B01D 53/14* (2006.01)
*B01D 53/52* (2006.01)
(Continued)

(52) U.S. Cl.
CPC ..... *B01D 53/1493* (2013.01); *B01D 53/1425* (2013.01); *B01D 53/1468* (2013.01);
(Continued)

(58) Field of Classification Search
None
See application file for complete search history.

(56) References Cited

U.S. PATENT DOCUMENTS

| 4,537,753 A | 8/1985 | Wagner et al. |
| 4,551,158 A | 11/1985 | Wagner et al. |

(Continued)

FOREIGN PATENT DOCUMENTS

| CA | 1290553 C | 10/1991 |
| CA | 1295810 C | 2/1992 |

(Continued)

OTHER PUBLICATIONS

International Search Report for PCT/EP2017/058122 dated May 11, 2017.
(Continued)

*Primary Examiner* — Daniel Berns
(74) *Attorney, Agent, or Firm* — Drinker Biddle & Reath LLP

(57) ABSTRACT

A process for removing acid gases from a fluid stream, wherein the fluid stream is contacted with an absorbent comprising a compound of the general formula (I), wherein $R_1$ and $R_2$ are independently $C_1$-$C_4$-alkyl; $R_3$ is selected from hydrogen and $C_1$-$C_4$-alkyl, $R_4$, $R_5$ and $R_6$ are independently selected from hydrogen and $C_1$-$C_4$-alkyl; x and y are
(Continued)

integers from 2 to 4 and z is an integer from 1 to 3, to obtain a treated fluid stream and a laden absorbent. The process allows for a high cyclic capacity while the compounds of the absorbent have a reduced tendency to foaming and low volatility.

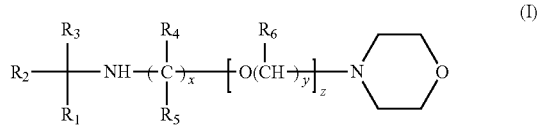

(I)

11 Claims, 3 Drawing Sheets

(51) Int. Cl.
*B01D 53/78* (2006.01)
*B01D 53/96* (2006.01)
(52) U.S. Cl.
CPC .............. *B01D 53/1462* (2013.01); *B01D 2252/20452* (2013.01); *B01D 2252/20489* (2013.01); *B01D 2257/304* (2013.01)

(56) References Cited

U.S. PATENT DOCUMENTS

| | | |
|---|---|---|
| 4,553,984 A | 11/1985 | Volkamer et al. |
| 4,997,630 A | 3/1991 | Wagner et al. |
| 4,999,031 A | 3/1991 | Gerhardt et al. |
| 8,487,135 B2 | 7/2013 | Kubanek et al. |
| 10,207,217 B2 | 2/2019 | Ingram et al. |
| 10,214,482 B2 | 2/2019 | Ingram et al. |
| 2013/0011314 A1 | 1/2013 | Porcheron et al. |
| 2015/0027055 A1 | 1/2015 | Kortunov et al. |
| 2017/0282116 A1 | 10/2017 | Ingram et al. |
| 2018/0186725 A1 | 7/2018 | Schaub et al. |
| 2018/0221811 A1 | 8/2018 | Vorberg et al. |
| 2018/0272271 A1 | 9/2018 | Ingram et al. |
| 2018/0297926 A1 | 10/2018 | Schaub et al. |
| 2018/0311611 A1 | 11/2018 | Vorberg et al. |

FOREIGN PATENT DOCUMENTS

| | | |
|---|---|---|
| EP | 0121109 A2 | 10/1984 |
| EP | 0124835 A2 | 11/1984 |
| EP | 0159495 A2 | 10/1985 |
| EP | 0190434 A2 | 8/1986 |
| EP | 0359991 A1 | 3/1990 |
| WO | WO-0100271 A1 | 1/2001 |
| WO | WO-2011067199 A1 | 6/2011 |
| WO | WO-2014001664 A1 | 1/2014 |

OTHER PUBLICATIONS

Written Opinion of the International Searching Authority for PCT/EP2017/058122 dated May 11, 2017.
U.S. Appl. No. 15/781,555, filed Jun. 1, 2018.
U.S. Appl. No. 16/074,100, filed Jul. 31, 2018.
U.S. Appl. No. 16/093,731, filed Oct. 15, 2018.
U.S. Appl. No. 16/238,069, filed Jan. 2, 2019.

USE OF MORPHOLINE-BASED HINDERED AMINE COMPOUNDS FOR SELECTIVE REMOVAL OF HYDROGEN SULFIDE

CROSS-REFERENCE TO RELATED APPLICATIONS

This application is a national stage application (under 35 U.S.C. § 371) of PCT/EP2017/058122, filed Apr. 5, 2017, which claims benefit of European Application No. 16166787.8, filed Apr. 25, 2016, both of which are incorporated herein by reference in their entirety.

The present invention relates to amine compounds suitable for removal of acid gases from a fluid stream, especially for selective removal of hydrogen sulfide from a fluid stream. The present invention also relates to an absorbent and to the use thereof and to a process for removing acid gases from a fluid stream, especially for selective removal of hydrogen sulfide from a fluid stream.

The removal of acid gases, for example $CO_2$, $H_2S$, $SO_2$, $CS_2$, HCN, COS or mercaptans, from fluid streams such as natural gas, refinery gas or synthesis gas is desirable for various reasons. Sulfur compounds in natural gas tend to form corrosive acids in particular together with the water frequently entrained by the natural gas. For the transport of the natural gas in a pipeline or further processing in a natural gas liquefaction plant (LNG=liquefied natural gas), given limits for the sulfur-containing impurities therefore have to be observed. In addition, numerous sulfur compounds are malodorous and toxic even at low concentrations.

Carbon dioxide has to be removed from natural gas because a high concentration of $CO_2$ reduces the calorific value of the gas. Moreover, $CO_2$ in conjunction with moisture, can lead to corrosion in pipes and valves.

Known processes for removing acid gases include scrubbing operations with aqueous absorbent solutions of inorganic or organic bases. When acid gases are dissolved in the absorbent, ions form with the bases. The absorbent can be regenerated by decompression to a lower pressure and/or by stripping, whereby the ionic species react in reverse and the acid gases are released and/or stripped out by means of steam. After the regeneration process, the absorbent can be reused.

A process in which $CO_2$ and $H_2S$, are substantially removed is referred to as "total absorption". Occasionally, it is necessary or desirable to treat acid gas mixtures containing both $CO_2$ and $H_2S$ so as to remove the $H_2S$ selectively from the mixture while minimizing removal of the $CO_2$. While removal of $CO_2$ may be necessary to avoid corrosion problems and provide the required heating value to the consumer, selective $H_2S$ removal may be necessary or desirable. Natural gas pipeline specifications, for example, set more stringent limits on the $H_2S$ level than on the $CO_2$ since the $H_2S$ is more toxic and corrosive than $CO_2$: common carrier natural gas pipeline specifications typically limit the $H_2S$ content to 4 ppmv with a more lenient limitation on the $CO_2$ at 2 vol %. Selective $H_2S$ removal is often desirable to enrich the $H_2S$ level in the feed to a sulfur recovery, such as a downstream Claus plant.

Severely sterically hindered secondary amines, such as 2-(2-tert-butylaminoethoxy)ethanol (TBAEE), and tertiary amines, such as methyldiethanolamine (MDEA), exhibit kinetic selectivity for $H_2S$ over $CO_2$. Such amines are therefore suitable for selective removal of $H_2S$ from gas mixtures comprising $CO_2$ and $H_2S$. These amines do not react directly with $CO_2$; instead, $CO_2$ is reacted in a slow reaction with the amine and with water to give bicarbonate. The reaction kinetics allow $H_2S$ to react more rapidly with the amine groups of the sorbent to form a hydrosulfide salt in aqueous solution.

The use of hydroxyl-substituted amines (alkanolamines) such as those mentioned above has become common since the presence of the hydroxyl groups tends to improve the solubility of the absorbent/acid gas reaction products in the aqueous solvent systems widely used, so facilitating circulation of the solvent through the conventional absorber tower/regeneration tower unit. This preference may, however, present its own problems in certain circumstances. A current business driver is to reduce the cost to regenerate and to recompress acid gases prior to sequestration. For natural gas systems, the separation of the acid gases can occur at pressures of about 4,800-15,000 kPaa, more typically from about 7,250-8,250 kPaa. While the alkanolamines will effectively remove acid gases at these pressures, the selectivity for $H_2S$ removal can be expected to decrease markedly both by direct physisorption of the $CO_2$ in the liquid solvent and by reaction with the hydroxyl groups on the amine compound. Although the $CO_2$ reacts preferentially with the amino nitrogen, higher pressures force reaction with the oxygens and under the higher pressures, the bicarbonate/hemicarbonate/carbonate reaction product(s) formed by the reaction at the hydroxyl site is stabilized with a progressive loss in $H_2S$ selectivity with increasing pressure.

Although the presence of the hydroxyl groups improves the aqueous solubility of the amines, hydroxyl groups tend to impart surfactant properties to the absorbent/acid gas reaction products, thereby potentially causing troublesome foaming phenomena during the operation of the gas treatment unit. Also, alkanolamines such as 2-(2-tert-butylaminoethoxy)ethanol may suffer from a marked volatility, causing absorbent losses during the operation of the gas treatment unit.

US 2015/0027055 A1 describes a process for selectively removing $H_2S$ from a $CO_2$-containing gas mixture by means of an absorbent comprising sterically hindered, terminally etherified alkanolamines. It was found that the terminal etherification of the alkanolamines and the exclusion of water permits a higher $H_2S$ selectivity.

WO 2014/001664 discloses compounds of the formula below and their use in the removal of acid gases:

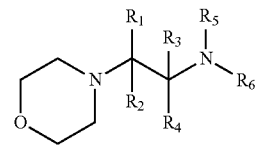

$R_1$ through $R_4$ are selected from H and alkyl, whereas $R_5$ and $R_6$ are alkyl or $R_5$ and $R_6$ together form a cycle. These compounds, incorporating only tertiary amino groups, are expected to exhibit limited $H_2S$ capacity since $H_2S$ capacity attributed to tertiary amino groups is known to be lower than that of, e.g., sterically hindered secondary amino groups.

EP 0 124 835 discloses bis-tertiary amino alkyl derivatives for acid gas removal from gas streams. A preferred derivative is bis-(2-morpholino ethyl) ether.

It is an object of the invention to provide a process for removing acid gases from fluid streams by means of an absorbent, especially for selective removal of hydrogen sulfide from a fluid stream. The compounds constituting the absorbent are to have reduced tendency to foaming and low volatility. Desirably, the absorbents are to have high cyclic capacity. The invention further relates to the use of an absorbent for removing acid gases from fluid streams.

The object is achieved by a process for removing acid gases from a fluid stream, wherein the fluid stream is contacted with an absorbent comprising a solution of a compound of the general formula (I)

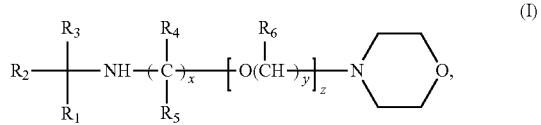

in which $R_1$ and $R_2$ are independently $C_1$-$C_4$-alkyl; $R_3$ is selected from hydrogen and $C_1$-$C_4$-alkyl, $R_4$, $R_5$ and $R_6$ are independently selected from hydrogen and $C_1$-$C_4$-alkyl; x and y are integers from 2 to 4 and z is an integer from 1 to 3.

Preferably, $R_4$, $R_5$ and $R_6$ are hydrogen. Preferably, x is 2 or 3. Preferably, y is 2. Preferably, z is 1.

In preferred embodiments, $R_1$ and $R_2$ are methyl and $R_3$ is hydrogen; or $R_1$, $R_2$ and $R_3$ are methyl; or $R_1$ and $R_2$ are methyl and $R_3$ is ethyl.

Preferably, the compound of the general formula (I) is selected from N-[2-(2-tert-butylaminoethoxy)ethyl]-morpholine and N-[2-(3-tert-butylaminopropoxy)ethyl]-morpholine.

The compounds of the general formula (I) comprise a secondary amino group and a tertiary amino group. The nitrogen atom in the secondary amino group has at least one secondary or tertiary carbon atom directly adjacent. The secondary amino group is thus sterically hindered.

The compounds of the general formula (I) can be prepared in various ways. In one mode of preparation, morpholine is reacted with an sec-alkylamino- or tert-alkylaminoalkoxyalkanol such as 2-(2-tert-butylaminoethoxy)ethanol. The reaction is suitably effected in the presence of hydrogen in the presence of a hydrogenation/dehydrogenation catalyst, for example of a copper-containing hydrogenation/dehydrogenation catalyst, at 160 to 220° C.:

Alternatively, an N-((hydroxyalkyl)alkoxy)-morpholine, such as N-(2-(2-hydroxyethyl)ethoxy)-morpholine, can be reacted with a primary amine $R_1R_2R_3C—NH_2$. The reaction is suitably effected in the presence of hydrogen in the presence of a hydrogenation/dehydrogenation catalyst, for example of a copper-containing hydrogenation/dehydrogenation catalyst, at 160 to 220° C.

The absorbent used for removal of acid gases from a fluid stream, especially for selective removal of hydrogen sulfide from a fluid stream comprising carbon dioxide and hydrogen sulfide, comprises a solution of a compound of the general formula (I).

The absorbent comprises preferably 10% to 70% by weight, more preferably 15% to 65% by weight and most preferably 20% to 60% by weight of a compound of the general formula (I), based on the weight of the absorbent.

In one embodiment, the absorbent comprises a tertiary amine or severely sterically hindered primary amine and/or severely sterically hindered secondary amine other than the compounds of the general formula (I). Severe steric hindrance is understood to mean a tertiary carbon atom directly adjacent to a primary or secondary nitrogen atom. In this embodiment, the absorbent comprises the tertiary amine or severely sterically hindered amine other than the compounds of the general formula (I) generally in an amount of 5% to 50% by weight, preferably 10% to 40% by weight and more preferably 20% to 40% by weight, based on the weight of the absorbent.

The suitable tertiary amines other than the compounds of the general formula (I) especially include:
1. Tertiary alkanolamines such as
bis(2-hydroxyethyl)methylamine (methyldiethanolamine, MDEA), tris(2-hydroxyethyl)amine (triethanolamine, TEA), tributanolamine, 2-diethylaminoethanol (diethylethanolamine, DEEA), 2-dimethylaminoethanol (dimethylethanolamine, DMEA), 3-dimethylamino-1-propanol (N,N-dimethylpropanolamine), 3-diethylamino-1-propanol, 2-diisopropylaminoethanol (DIEA), N,N-bis(2-hydroxypropyl)methylamine (methyldiisopropanolamine, MDIPA);
2. Tertiary amino ethers such as
3-methoxypropyldimethylamine;
3. Tertiary polyamines, for example bis-tertiary diamines such as
N,N,N',N'-tetramethylethylenediamine, N,N-diethyl-N',N'-dimethylethylenediamine, N,N,N',N'-tetraethylethylenediamine, N,N,N',N'-tetramethyl-1,3-propanediamine (TMPDA), N,N,N',N'-tetraethyl-1,3-propanediamine (TEPDA), N,N,N',N'-tetramethyl-1,6-hexanediamine, N,N-dimethyl-N',N'-diethylethylenediamine (DMDEEDA), 1-dimethylamino-2-dimethylaminoethoxyethane (bis[2-(dimethylamino)ethyl] ether), 1,4-diazabicyclo[2.2.2]octane (TEDA), tetramethyl-1,6-hexanediamine;
and mixtures thereof.

Tertiary alkanolamines, i.e. amines having at least one hydroxyalkyl group bonded to the nitrogen atom, are generally preferred. Particular preference is given to methyldiethanolamine (MDEA).

The suitable severely sterically hindered amines (i.e. amines having a tertiary carbon atom directly adjacent to a primary or secondary nitrogen atom) other than the compounds of the general formula (I) especially include:
1. Severely sterically hindered secondary alkanolamines such as
2-(2-tert-butylaminoethoxy)ethanol (TBAEE), 2-(2-tert-butylamino)propoxyethanol, 2-(2-tert-amylaminoethoxy)ethanol, 2-(2-(1-methyl-1-ethylpropylamino)ethoxy)ethanol, 2-(tert-butylamino)ethanol, 2-tert-butylamino-1-propanol, 3-tert-butylamino-1-propanol, 3-tert-butylamino-1-butanol, and 3-aza-2,2-dimethylhexane-1,6-diol;
2. Severely sterically hindered primary alkanolamines such as
2-amino-2-methylpropanol (2-AMP); 2-amino-2-ethylpropanol; and 2-amino-2-propylpropanol;
3. Severely sterically hindered amino ethers such as
1,2-bis(tert-butylaminoethoxy)ethane, bis(tert-butylaminoethyl) ether;
and mixtures thereof.

Severely sterically hindered secondary alkanolamines are generally preferred. Particular preference is given to 2-(2-tert-butylaminoethoxy)ethanol.

Generally the absorbent does not comprise any sterically unhindered primary amine or sterically unhindered secondary amine. A sterically unhindered primary amine is understood to mean compounds having primary amino groups to which only hydrogen atoms or primary or secondary carbon atoms are bonded. A sterically unhindered secondary amine is understood to mean compounds having secondary amino groups to which only hydrogen atoms or primary carbon atoms are bonded. Sterically unhindered primary amines or sterically unhindered secondary amines act as strong activators of $CO_2$ absorption. Their presence in the absorbent can result in loss of the $H_2S$ selectivity of the absorbent.

In one embodiment, the absorbent is an aqueous solution. In one embodiment, the aqueous absorbent comprises an acid. The absorbent may, as well as water and optionally an acid, comprise one or more water-miscible organic solvents.

The acid preferably has a $pK_A$ of less than 6, especially less than 5, as determined under standard conditions (25° C.). In the case of acids having more than one dissociation stage and accordingly more than one $pK_A$, this requirement is met where one of the $pK_A$ values is within the range specified. The acid is suitably selected from protic acids (Brønsted acids).

The acid is preferably added in such an amount that the pH of the aqueous solution measured at 120° C. is 7.9 to less than 9.5, preferably 8.0 to less than 8.8, more preferably 8.0 to less than 8.5, most preferably 8.0 to less than 8.2.

The amount of acid, in one embodiment, is 0.1% to 5.0% by weight, preferably 0.2% to 4.5% by weight, more preferably 0.5% to 4.0% by weight and most preferably 1.0% to 2.5% by weight, based on the weight of the absorbent.

The acid is selected from organic and inorganic acids. Suitable organic acids comprise, for example, phosphonic acids, sulfonic acids, carboxylic acids and amino acids. In particular embodiments, the acid is a polybasic acid.

Suitable acids are, for example, mineral acids such as hydrochloric acid, sulfuric acid, amidosulfuric acid, phosphoric acid, partial esters of phosphoric acid, for example mono- and dialkyl phosphates and mono- and diaryl phosphates such as tridecyl phosphate, dibutyl phosphate, diphenyl phosphate and bis(2-ethylhexyl) phosphate; boric acid;

carboxylic acids, for example saturated aliphatic monocarboxylic acids such as formic acid, acetic acid, propionic acid, butyric acid, isobutyric acid, valeric acid, isovaleric acid, pivalic acid, caproic acid, n-heptanoic acid, caprylic acid, 2-ethylhexanoic acid, pelargonic acid, caproic acid, neodecanoic acid, undecanoic acid, lauric acid, tridecanoic acid, myristic acid, pentadecanoic acid, palmitic acid, margaric acid, stearic acid, isostearic acid, arachic acid, behenic acid; saturated aliphatic polycarboxylic acids such as oxalic acid, malonic acid, succinic acid, glutaric acid, adipic acid, pimelic acid, suberic acid, azelaic acid, sebacic acid, dodecanedioic acid; cycloaliphatic mono- and polycarboxylic acids such as cyclohexanecarboxylic acid, hexahydrophthalic acid, tetrahydrophthalic acid, resin acids, naphthenic acids; aliphatic hydroxycarboxylic acids such as glycolic acid, lactic acid, mandelic acid, hydroxybutyric acid, tartaric acid, malic acid, citric acid; halogenated aliphatic carboxylic acids such as trichloroacetic acid or 2-chloropropionic acid; aromatic mono- and polycarboxylic acids such as benzoic acid, salicylic acid, gallic acid, the positionally isomeric toluic acids, methoxybenzoic acids, chlorobenzoic acids, nitrobenzoic acids, phthalic acid, terephthalic acid, isophthalic acid; technical carboxylic acid mixtures, for example Versatic acids;

sulfonic acids such as methylsulfonic acid, butylsulfonic acid, 3-hydroxypropylsulfonic acid, sulfoacetic acid, benzenesulfonic acid, p-toluenesulfonic acid, p-xylenesulfonic acid, 4-dodecylbenzenesulfonic acid, 1-naphthalenesulfonic acid, dinonylnaphthalenesulfonic acid and dinonylnaphthalenedisulfonic acid, trifluoromethyl- or nonafluoro-n-butylsulfonic acid, camphorsulfonic acid, 2-(4-(2-hydroxyethyl)-1-piperazinyl)ethanesulfonic acid (HEPES);

organic phosphonic acids, for example phosphonic acids of the formula (II)

$$R_9\text{—}PO_3H \quad (II)$$

in which $R_9$ is $C_{1-18}$-alkyl optionally substituted by up to four substituents independently selected from carboxyl, carboxamido, hydroxyl and amino.

These include alkylphosphonic acids such as methylphosphonic acid, propylphosphonic acid, 2-methylpropylphosphonic acid, t-butylphosphonic acid, n-butylphosphonic acid, 2,3-dimethylbutylphosphonic acid, octylphosphonic acid; hydroxyalkylphosphonic acids such as hydroxymethylphosphonic acid, 1-hydroxyethylphosphonic acid, 2-hydroxyethylphosphonic acid; arylphosphonic acids such as phenylphosphonic acid, tolylphosphonic acid, xylylphosphonic acid, amino-alkylphosphonic acids such as aminomethylphosphonic acid, 1-aminoethylphosphonic acid, 1-dimethylaminoethylphosphonic acid, 2-aminoethylphosphonic acid, 2-(N-methylamino)ethylphosphonic acid, 3-aminopropylphosphonic acid, 2-aminopropylphosphonic acid, 1-aminopropylphosphonic acid, 1-aminopropyl-2-chloropropylphosphonic acid, 2-aminobutylphosphonic acid, 3-aminobutylphosphonic acid, 1-aminobutylphosphonic acid, 4-aminobutylphosphonic acid, 2-aminopentylphosphonic acid, 5-aminopentylphosphonic acid, 2-aminohexylphosphonic acid, 5-aminohexylphosphonic acid, 2-aminooctylphosphonic acid, 1-aminooctylphosphonic acid, 1-aminobutylphosphonic acid; amidoalkylphosphonic acids such as 3-hydroxymethylamino-3-oxopropylphosphonic acid; and phosphonocarboxylic acids such as 2-hydroxyphosphonoacetic acid and 2-phosphonobutane-1,2,4-tricarboxylic acid;

phosphonic acids of the formula (III)

in which $R_{10}$ is H or $C_{1-6}$-alkyl, Q is H, OH or $NY_2$ and Y is H or $CH_2PO_3H_2$, such as 1-hydroxyethane-1,1-diphosphonic acid;

phosphonic acids of the formula (IV)

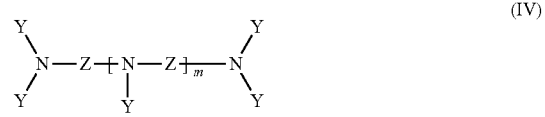

in which Z is $C_{2-6}$-alkylene, cycloalkanediyl, phenylene, or $C_{2-6}$-alkylene interrupted by cycloalkanediyl or phenylene, Y is $CH_2PO_3H_2$ and m is 0 to 4, such as ethylenediaminetetra(methylenephosphonic acid), diethylenetriamine-penta (methylenephosphonic acid) and bis(hexamethylene)triaminepenta-(methylenephosphonic acid);

phosphonic acids of the formula (V)

$$R_{11}\text{—}NY_2 \quad (V)$$

in which $R_{11}$ is $C_{1-6}$-alkyl, $C_{2-6}$-hydroxyalkyl or Y, and Y is $CH_2PO_3H_2$, such as nitrilotris(methylenephosphonic acid) and 2-hydroxyethyliminobis-(methylenephosphonic acid);

aminocarboxylic acids having tertiary amino groups or amino groups having at least one secondary or tertiary carbon atom immediately adjacent to the amino group, such as α-amino acids having tertiary amino groups or amino groups having at least one secondary or tertiary carbon atom immediately adjacent to the amino group, such as N,N-dimethylglycine (dimethylaminoacetic acid), N,N-diethylglycine, alanine (2-aminopropionic acid), N-methylalanine (2-(methylamino)propionic acid), N,N-dimethylalanine, N-ethylalanine, 2-methylalanine (2-aminoisobutyric acid), leucine (2-amino-4-methylpentan-1-oic acid), N-methylleucine, N,N-dimethylleucine, isoleucine (1-amino-2-methylpentanoic acid), N-methylisoleucine, N,N-dimethylisoleucine, valine (2-aminoisovaleric acid), α-methylvaline (2-amino-2-methylisovaleric acid), N-methylvaline (2-methylaminoisovaleric acid), N,N-dimethylvaline, proline (pyrrolidine-2-carboxylic acid), N-methylproline, N-methylserine, N,N-dimethylserine, 2-(methylamino)isobutyric acid, piperidine-2-carboxylic acid, N-methylpiperidine-2-carboxylic acid, β-amino acids having tertiary amino groups or amino groups having at least one secondary or tertiary carbon atom immediately adjacent to the amino group, such as 3-dimethylaminopropionic acid, N-methyliminodipropionic acid, N-methylpiperidine-3-carboxylic acid, γ-amino acids having tertiary amino groups or amino groups having at least one secondary or tertiary carbon atom immediately adjacent to the amino group, such as 4-dimethylaminobutyric acid, or aminocarboxylic acids having tertiary amino groups or amino groups having at least one secondary or tertiary carbon atom immediately adjacent to the amino group, such as N-methylpiperidine-4-carboxylic acid.

Among the inorganic acids, preference is given to phosphoric acid and sulfuric acid.

Among the carboxylic acids, preference is given to formic acid, acetic acid, benzoic acid, succinic acid and adipic acid.

Among the sulfonic acids, preference is given to methanesulfonic acid, p-toluenesulfonic acid and 2-(4-(2-hydroxyethyl)-1-piperazinyl)ethanesulfonic acid (HEPES).

Among the phosphonic acids, preference is given to 2-hydroxyphosphonoacetic acid, 2-phosphonobutane-1,2,4-tricarboxylic acid, 1-hydroxyethane-1,1-diphosphonic acid, ethylenediaminetetra(methylenephosphonic acid), diethylenetriaminepenta-(methylenephosphonic acid), bis(hexamethylene)triaminepenta(methylenephosphonic acid) (HDTMP) and nitrilotris(methylenephosphonic acid), among which 1-hydroxyethane-1,1-diphosphonic acid is particularly preferred.

Among the aminocarboxylic acids having tertiary amino groups or amino groups having at least one secondary or tertiary carbon atom immediately adjacent to the amino group, preference is given to N,N-dimethylglycine and N-methylalanine.

More preferably, the acid is an inorganic acid.

In one embodiment, the absorbent comprises at least one nonaqueous organic solvent. In particular cases, the absorbent contains only a limited amount of water, or essentially no water in addition to the nonaqueous organic solvent. It may be desirable to limit the water content of the absorbent, for example to a maximum of 20% by weight, alternatively to a maximum of 10% by weight, preferably to a maximum of 5% by weight, or a maximum of 2% by weight.

The nonaqueous solvent is preferably selected from:
$C_4$-$C_{10}$ alcohols such as n-butanol, n-pentanol and n-hexanol;
ketones such as cyclohexanone;
esters such as ethyl acetate and butyl acetate;
lactones such as γ-butyrolactone, δ-valerolactone and ε-caprolactone;
amides such as tertiary carboxamides, for example N,N-dimethylformamide; or N-formylmorpholine and N-acetylmorpholine;
lactams such as γ-butyrolactam, δ-valerolactam and ε-caprolactam and N-methyl-2-pyrrolidone (NMP);
sulfones such as sulfolane;
sulfoxides such as dimethyl sulfoxide (DMSO);
glycols such as ethylene glycol (EG) and propylene glycol;
polyalkylene glycols such as diethylene glycol (DEG) and triethylene glycol (TEG);
di- or mono($C_{1-4}$-alkyl ether) glycols such as ethylene glycol dimethyl ether;
di- or mono($C_{1-4}$-alkyl ether) polyalkylene glycols such as diethylene glycol dimethyl ether, dipropylene glycol monomethyl ether and triethylene glycol dimethyl ether;
cyclic ureas such as N,N-dimethylimidazolidin-2-one and dimethylpropyleneurea (DMPU);
thioalkanols such as ethylenedithioethanol, thiodiethylene glycol (thiodiglycol, TDG) and methylthioethanol;
and mixtures thereof.

More preferably, the nonaqueous solvent is selected from sulfones, glycols and polyalkylene glycols. Most preferably, the nonaqueous solvent is selected from sulfones. A preferred nonaqueous solvent is sulfolane.

The absorbent may also comprise additives such as corrosion inhibitors, enzymes, antifoams, etc. In general, the amount of such additives is in the range from about 0.005% to 3% by weight of the absorbent.

The present invention also relates to the use of the absorbent and its embodiments as described above for removal of acid gases from a fluid stream, especially for selective removal of hydrogen sulfide from a fluid stream comprising carbon dioxide and hydrogen sulfide.

In the present context, "selectivity for hydrogen sulfide" is understood to mean the value of the following quotient:

$$\frac{\frac{mol(H_2S)}{mol(CO_2)} \text{ liquid phase}}{\frac{mol(H_2S)}{mol(CO_2)} \text{ gas phase}}$$

where $$\frac{mol(H_2S)}{mol(CO_2)}$$

liquid phase is the molar $H_2S/CO_2$ ratio in a liquid phase which is in contact with a gas phase and $$\frac{mol(H_2S)}{mol(CO_2)}$$

gas phase is the molar $H_2S/CO_2$ ratio in the gas phase. In a standard gas scrubbing process, the liquid phase is the laden absorbent at the bottom of the absorber and the gas phase is the fluid stream to be treated.

The process of the invention is suitable for treatment of all kinds of fluids. Fluids are firstly gases such as natural gas, synthesis gas, coke oven gas, cracking gas, coal gasification gas, cycle gas, landfill gases and combustion gases, and secondly liquids that are essentially immiscible with the absorbent, such as LPG (liquefied petroleum gas) or NGL (natural gas liquids). The process of the invention is particularly suitable for treatment of hydrocarbonaceous fluid streams. The hydrocarbons present are, for example, aliphatic hydrocarbons such as $C_1$-$C_4$ hydrocarbons such as methane, unsaturated hydrocarbons such as ethylene or propylene, or aromatic hydrocarbons such as benzene, toluene or xylene.

The process of the invention is suitable for removal of acid gases, for example $CO_2$, $H_2S$, $SO_3$, $SO_2$, $CS_2$, HCN, COS and mercaptans. It is also possible for other acidic gases to be present in the fluid stream, such as COS and mercaptans.

The process is especially suitable for selective removal of hydrogen sulfide from a fluid stream comprising carbon dioxide and hydrogen sulphide and allows high $H_2S$ cleanup selectively at low solvent circulation rates. The process is useful in sulfur plant Tail Gas Treating Unit (TGTU) applications, in Acid-Gas Enrichment (AGE) processes to upgrade lean acid offgas from treating units to higher-quality Claus plant feed, or for the treatment of associated gases and refinery gases.

In the process of the invention, the fluid stream is contacted with the absorbent in an absorption step in an absorber, as a result of which carbon dioxide and hydrogen sulfide are at least partly scrubbed out. This gives a $CO_2$- and $H_2S$-depleted fluid stream and a $CO_2$- and $H_2S$-laden absorbent.

The absorber used is a scrubbing apparatus used in customary gas scrubbing processes. Suitable scrubbing apparatuses are, for example, random packings, columns having structured packings and having trays, membrane contactors, radial flow scrubbers, jet scrubbers, Venturi scrubbers and rotary spray scrubbers, preferably columns having structured packings, having random packings and having trays, more preferably columns having trays and having random packings. The fluid stream is preferably treated with the absorbent in a column in countercurrent. The fluid is generally fed into the lower region and the absorbent into the upper region of the column. Installed in tray columns are sieve trays, bubble-cap trays or valve trays, over which the liquid flows. Columns having random packings can be filled with different shaped bodies. Heat and mass transfer are improved by the increase in the surface area caused by the shaped bodies, which are usually about 25 to 80 mm in size. Known examples are the Raschig ring (a hollow cylinder), Pall ring, Hiflow ring, Intalox saddle and the like. The random packings can be introduced into the column in an ordered manner, or else randomly (as a bed). Possible materials include glass, ceramic, metal and plastics. Structured packings are a further development of ordered random packings. They have a regular structure. As a result, it is possible in the case of packings to reduce pressure drops in the gas flow. There are various designs of structured packings, for example woven packings or sheet metal packings. Materials used may be metal, plastic, glass and ceramic.

The temperature of the absorbent in the absorption step is generally about 30 to 100° C., and when a column is used is, for example, 30 to 70° C. at the top of the column and 50 to 100° C. at the bottom of the column.

The process of the invention may comprise one or more, especially two, successive absorption steps. The absorption can be conducted in a plurality of successive component steps, in which case the crude gas comprising the acidic gas constituents is contacted with a substream of the absorbent in each of the component steps. The absorbent with which the crude gas is contacted may already be partly laden with acidic gases, meaning that it may, for example, be an absorbent which has been recycled from a downstream absorption step into the first absorption step, or be partly regenerated absorbent. With regard to the performance of the two-stage absorption, reference is made to publications EP 0 159 495, EP 0 190 434, EP 0 359 991 and WO 00100271.

The person skilled in the art can achieve a high level of hydrogen sulfide removal with a defined selectivity by varying the conditions in the absorption step, such as, more particularly, the absorbent/fluid stream ratio, the column height of the absorber, the type of contact-promoting internals in the absorber, such as random packings, trays or structured packings, and/or the residual loading of the regenerated absorbent.

Since $CO_2$ is absorbed more slowly than $H_2S$, more $CO_2$ is absorbed in a longer residence time than in a shorter residence time. A higher column therefore brings about a less selective absorption. Trays or structured packings with relatively high liquid holdup likewise lead to a less selective absorption. The heating energy introduced in the regeneration can be used to adjust the residual loading of the regenerated absorbent. A lower residual loading of regenerated absorbent leads to improved absorption.

The process preferably comprises a regeneration step in which the $CO_2$- and $H_2S$-laden absorbent is regenerated. In the regeneration step, $CO_2$ and $H_2S$ and optionally further acidic gas constituents are released from the $CO_2$- and $H_2S$-laden absorbent to obtain a regenerated absorbent. Preferably, the regenerated absorbent is subsequently recycled into the absorption step. In general, the regeneration step comprises at least one of the measures of heating, decompressing and stripping with an inert fluid.

The regeneration step preferably comprises heating of the absorbent laden with the acidic gas constituents, for example by means of a boiler, natural circulation evaporator, forced circulation evaporator or forced circulation flash evaporator. The absorbed acid gases are stripped out by means of the steam obtained by heating the solution. Rather than steam, it is also possible to use an inert fluid such as nitrogen. The absolute pressure in the desorber is normally 0.1 to 3.5 bar, preferably 1.0 to 2.5 bar. The temperature is normally 50° C. to 170° C., preferably 80° C. to 130° C., the temperature of course being dependent on the pressure.

The regeneration step may alternatively or additionally comprise a decompression. This includes at least one decompression of the laden absorbent from a high pressure as exists in the conduction of the absorption step to a lower pressure. The decompression can be accomplished, for example, by means of a throttle valve and/or a decompression turbine. Regeneration with a decompression stage is described, for example, in publications U.S. Pat. Nos. 4,537, 753 and 4,553,984.

The acidic gas constituents can be released in the regeneration step, for example, in a decompression column, for example a flash vessel installed vertically or horizontally, or a countercurrent column with internals.

The regeneration column may likewise be a column having random packings, having structured packings or having trays. The regeneration column, at the bottom, has a heater, for example a forced circulation evaporator with circulation pump. At the top, the regeneration column has an outlet for the acid gases released. Entrained absorption medium vapors are condensed in a condenser and recirculated to the column.

It is possible to connect a plurality of decompression columns in series, in which regeneration is effected at different pressures. For example, regeneration can be effected in a preliminary decompression column at a high pressure typically about 1.5 bar above the partial pressure of the acidic gas constituents in the absorption step, and in a main decompression column at a low pressure, for example 1 to 2 bar absolute. Regeneration with two or more decompression stages is described in publications U.S. Pat. Nos. 4,537,753, 4,553,984, EP 0 159 495, EP 0 202 600, EP 0 190 434 and EP 0 121 109.

The invention is illustrated in detail by the appended drawings and the examples which follow.

Figure 1:
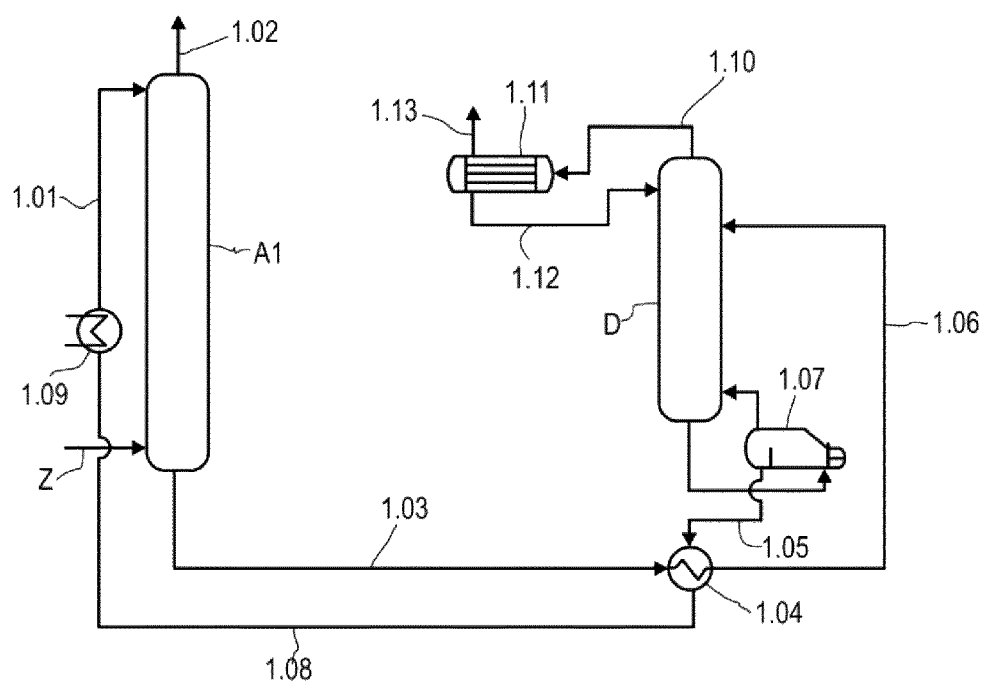
FIG. 1 is a schematic diagram of a plant suitable for performing the process of the invention.

According to FIG. 1, via the inlet Z, a suitably pre-treated gas comprising hydrogen sulfide and carbon dioxide is contacted in counter-current, in an absorber A1, with regenerated absorbent which is fed in via the absorbent line 1.01. The absorbent removes hydrogen sulfide and carbon dioxide from the gas by absorption; this affords a hydrogen sulfide- and carbon dioxide-depleted clean gas via the offgas line 1.02.

Via the absorbent line 1.03, the heat exchanger 1.04 in which the $CO_2$- and $H_2S$-laden absorbent is heated up with the heat from the regenerated absorbent conducted through the absorbent line 1.05, and the absorbent line 1.06, the $CO_2$- and $H_2S$-laden absorbent is fed to the desorption column D and regenerated.

Between the absorber A1 and heat exchanger 1.04, one or more flash vessels may be provided (not shown in FIG. 1), in which the $CO_2$- and $H_2S$-laden absorbent is decompressed to, for example, 3 to 15 bar.

From the lower part of the desorption column D, the absorbent is conducted into the boiler 1.07, where it is heated. The steam that arises is recycled into the desorption column D, while the regenerated absorbent is fed back to the absorber A1 via the absorbent line 1.05, the heat exchanger 1.04 in which the regenerated absorbent heats up the $CO_2$- and $H_2S$-laden absorbent and at the same time cools down itself, the absorbent line 1.08, the cooler 1.09 and the absorbent line 1.01. Instead of the boiler shown, it is also possible to use other heat exchanger types for energy introduction, such as a natural circulation evaporator, forced circulation evaporator or forced circulation flash evaporator. In the case of these evaporator types, a mixed-phase stream of regenerated absorbent and steam is returned to the bottom of the desorption column D, where the phase separation between the vapor and the absorbent takes place. The regenerated absorbent to the heat exchanger 1.04 is either drawn off from the circulation stream from the bottom of the desorption column D to the evaporator or conducted via a separate line directly from the bottom of the desorption column D to the heat exchanger 1.04.

The $CO_2$- and $H_2S$-containing gas released in the desorption column D leaves the desorption column D via the offgas line 1.10. It is conducted into a condenser with integrated phase separation 1.11, where it is separated from entrained absorbent vapor. In this and all the other plants suitable for performance of the process of the invention, condensation and phase separation may also be present separately from one another. Subsequently, the condensate is conducted through the absorbent line 1.12 into the upper region of the desorption column D, and a $CO_2$- and $H_2S$-containing gas is discharged via the gas line 1.13.

The invention is illustrated in detail by the examples which follow.

The following abbreviations were used:
MDEA: methyldiethanolamine
TBAEE: tert-butylamine ethoxyethanol
M3ETB: methoxyethoxyethoxyethyl-tert-butylamine
TBAEEM: tert-butylaminoethoxyethylmorpholine
TBAEM: tert-butylaminoethylmorpholine
Bis-MOE: bis-(2-morpholinoethyl)ether

PRODUCTION EXAMPLE 1

Preparation of tert-butylaminoethoxyethylmorpholine

Two oil-heated metal reactors having a length of 100 cm each and an internal diameter of 12 mm were connected in series. Each of the reactors was charged with 90 ml (122 g) of an amination catalyst (containing Ni, Co, Cu, Sn on $Al_2O_3$ obtained according to WPO 2011/067199, example 5). Subsequently, the catalyst was activated by passing 10 NL/h $H_2$ at 260° C. and ambient pressure.

A mixture of morpholine and 2-(2-tert-butylaminoethoxy) ethanol (molar ratio 2:1) was passed over the catalyst at 170 to 195° C. and a pressure of 70 bar together with hydrogen (10 NL/h). The 2-(2-tert-butylaminoethoxy)ethanol weight hourly space velocity was set to 0.2 kg/(l·h). The reaction output was analyzed by means of gas chromatography (column: 30 m Rtx-5 Amine from Restek, internal diameter: 0.32 mm, $d_f$: 1.5 μm, temperature program 60° C. to 280° C. in steps of 4° C./min). The following analysis values are reported in GC area percent.

The GC analysis showed a conversion of 73-98% based on 2-(2-tert-butylaminoethoxy)ethanol used, and tert-butylaminoethoxyethylmorpholine (TBAEEM) was obtained in a selectivity of 17-21%. The crude product was purified by distillation. After the removal of excess morpholine at 80° C. and 1 mbar, the target product was isolated at a distillation temperature of 64° C. at 1 mbar in a purity of >97%.

REFERENCE PRODUCTION EXAMPLE 2

Preparation of tert-butylaminoethylmorpholine

An oil-heated glass reactor having a length of 0.9 m and an internal diameter of 28 mm was charged with 250 mL of V2A mesh rings (diameter 5 mm), above that 200 mL of a copper catalyst (support: alumina) and finally 550 mL of V2A mesh rings (diameter 5 mm).

Subsequently, the catalyst was activated as follows: Over a period of 2 h, at 160° C., a gas mixture consisting of $H_2$ (5% by volume) and $N_2$ (95% by volume) was passed over the catalyst at 100 L/h. Thereafter, the catalyst was kept at a temperature of 180° C. for a further 2 h. Subsequently, at 200° C. over a period of 1 h, a gas mixture consisting of $H_2$ (10% by volume) and $N_2$ (90% by volume) was passed over the catalyst, then, at 200° C. over a period of 30 min, a gas mixture consisting of $H_2$ (30% by volume) and $N_2$ (70% by volume) and finally, at 200° C. over a period of 1 h, $H_2$.

The oil bath temperature was set to 180 to 200° C. 65-130 g/h of a mixture of tert-butylamine (TBA) and N-(2-hydroxyethyl)-morpholine (molar ratio of 4:1) was passed over the catalyst at 200° C. together with hydrogen (80 L/h). The reaction output was condensed by means of a jacketed coil condenser and analyzed by means of gas chromatography (column: 30 m DB1 from Agilent, internal diameter: 0.25 mm, $d_f$: 1.0 μm, temperature program 80° C. to 280° C. in steps of 10° C./min). The following analysis values are reported in GC area percent.

The GC analysis showed a conversion of 80% based on N-(2-hydroxyethyl)-morpholine used, and 2-methyl-N-(2-morpholinoethyl)-propane-2-amine was obtained in a selectivity of 90%. The crude product was purified by distillation. After the removal of excess tert-butylamine under standard pressure, the target product was isolated at a bottom temperature of 115° C. and a distillation temperature of 104° C. at 10 mbar in a purity of >99.7%.

EXAMPLE 1

Selectivity studies

The following experimental and analytical methods were used in the selectivity studies. The process absorption unit (PAU) is a semi-batch system, comprising a water saturator, a stirred autoclave to which gas can be fed in up-flow mode, and a condenser. The autoclave is equipped with a pressure gauge and a type J thermocouple. A safety rupture disc is attached to the autoclave head. A high wattage ceramic fiber heater is used to supply heat to the autoclave. The gas flows are regulated by Brooks mass flow controllers and the temperature of the condenser is maintained by a chiller.

A custom LabVIEW program is used to control the PAU operation and to acquire experimental data (temperature, pressure, stirrer speed, pH, gas flow rate, and off-gas concentration).

The experiments described hereinbelow were performed by flowing the test acid gas mixture through the autoclave in which the amine solution was previously loaded. The acid gas mixture was fed to the bottom of the reactor by-passing the water saturator. The gases leaving the autoclave were transferred through the condenser (maintained at 10° C.) in order to remove any entrained liquids. A slip-stream of the off-gas leaving the condenser was piped to a micron-GC (Inficon) for analysis while the main gas flow passed through a scrubber. After reaching breakthrough, nitrogen was used to purge the system.

The off-gas composition was measured using a custom-built micro GC. The micro GC is configured as a refinery Gas Analyzer and includes four columns (Mole Sieve, PLOT U, OV-1, PLOT Q) and four TCD detectors. A slip stream of the off-gas was injected into the micro GC approximately every 2 minutes. A small internal vacuum pump was used to transfer the sample into the micro GC. The nominal pump rate was ~20 mL/min in order to achieve 10× the volume of line flushes between the sample tee and the micro GC. The actual gas injected into the micro GC was ~1 μL. The PLOT U column was used to separate and identify $H_2S$ and $CO_2$, and the micro TCD was used to quantify $H_2S$ and $CO_2$.

In Example 1, amine aqueous solutions at a concentration of 36 wt.-% amine were tested. Test conditions for Example 1 were as follows: gas feed composition: 10 mol % $CO_2$, 1 mol % $H_2S$, balance $N_2$; gas flow rate: 154 sccm; temperature: 40.8° C., pressure: 1 bar; volume: 15 mL; stirring rate: 200 rpm.

Figure 2:
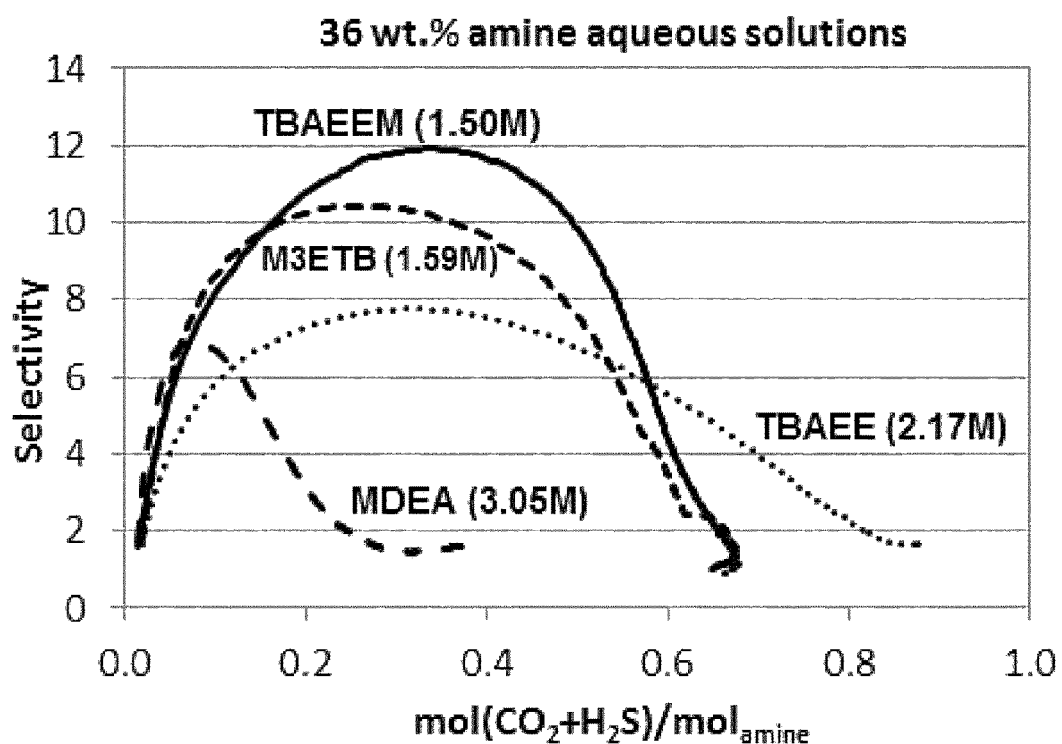
FIG. 2 is a plot of the selectivity of $H_2S$ over $CO_2$ as a function of acid gas loading with different amine aqueous solutions an amine concentration of 36 wt.-%.
Figure 3:
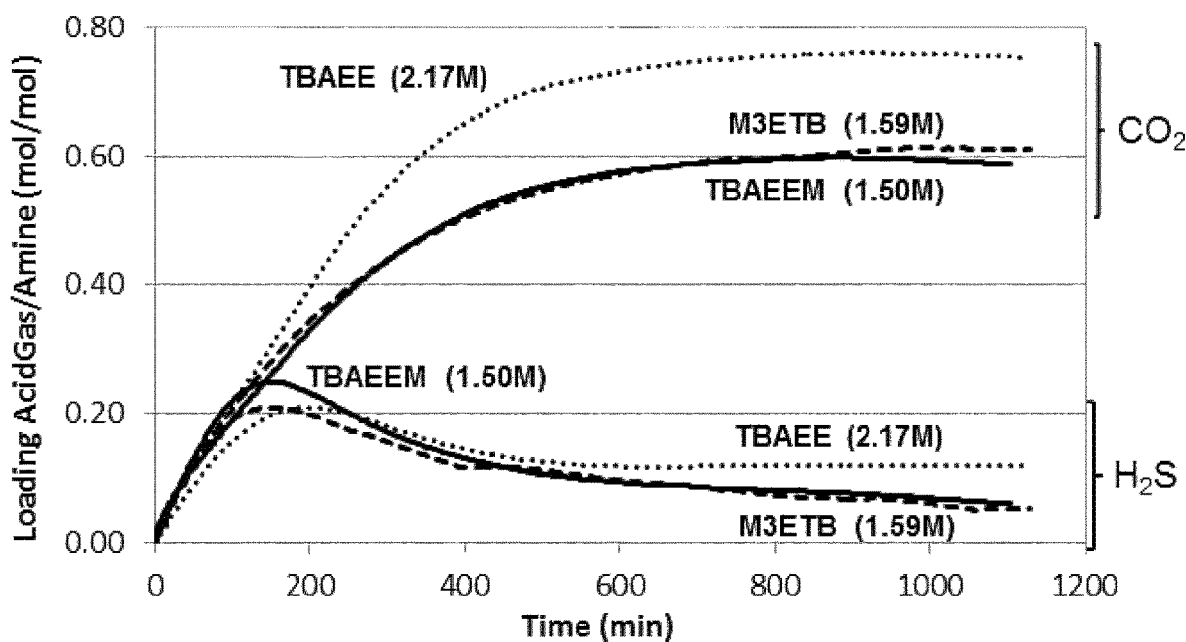
FIG. 3 is a plot of the $CO_2$ and $H_2S$ uptake as a function of treatment time by aqueous amine solutions.

FIG. 2 is a plot of the selectivity of $H_2S$ over $CO_2$ as a function of acid gas loading with different amine aqueous solutions. FIG. 3 is a plot of the $CO_2$ and $H_2S$ uptake as a function of treatment time by aqueous amine solutions.

The following conclusions are readily apparent from the plotted data of FIGS. 2 and 3. The capability of TBAEEM to selectively remove $H_2S$ is higher than MDEA, TBAEE and M3ETB. Higher $H_2S$ selectivity obtained by TBAEEM is due to higher $H_2S$ absorption when compared with the other sterically hindered amines, TBAEE and M3ETB. M3ETB and TBAEEM have similar $CO_2$ pickup.

EXAMPLE 2

In this example, amine aqueous solutions at a molar concentration of 2.17 M amine were tested. Test conditions for Example 2 were as follows: gas feed composition: 10 mol % $CO_2$, 1 mol % $H_2S$, balance $N_2$; gas flow rate: 154 sccm; temperature: 40.8° C., pressure: 1 bar; volume: 15 mL; stirring rate: 200 rpm.

Figure 4:
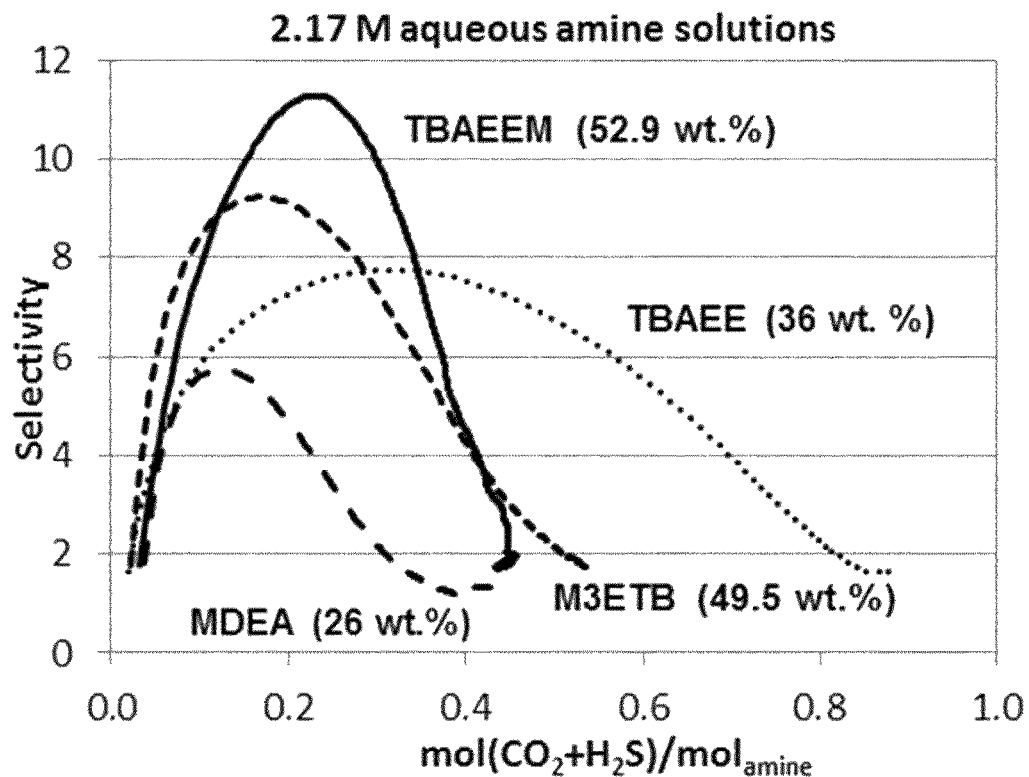
FIG. 4 is a plot of the selectivity of $H_2S$ over $CO_2$ as a function of acid gas loading with different amine aqueous solutions an amine concentration of 2.17 M.
Figure 5:
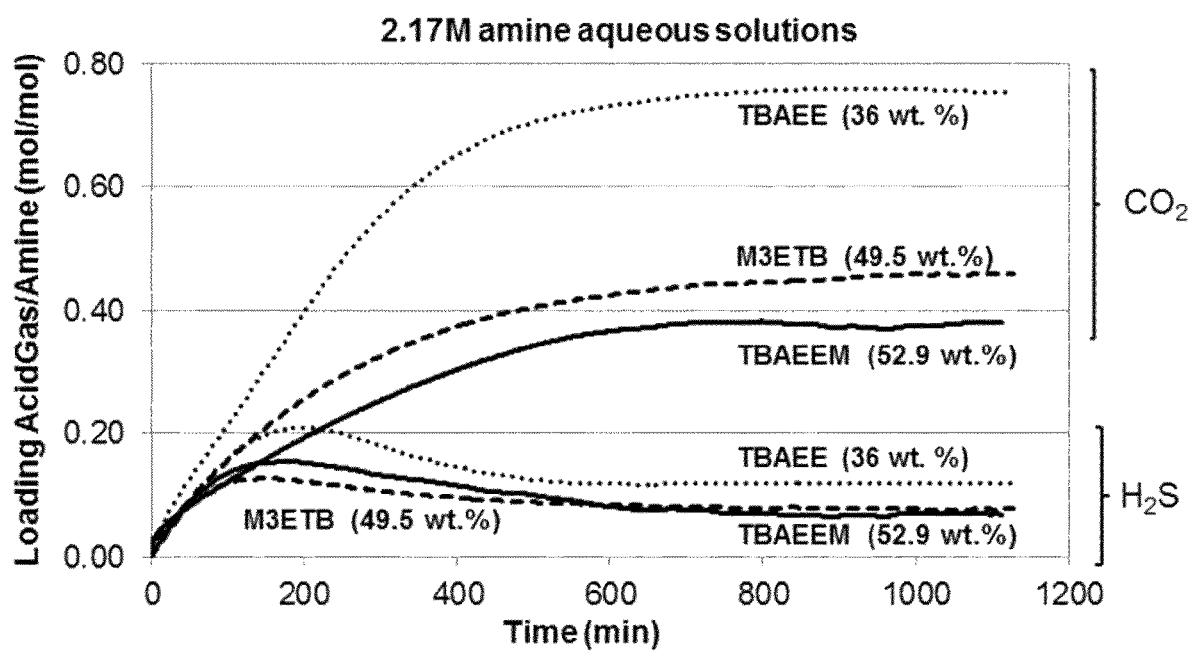
FIG. 5 is a plot of the $CO_2$ and $H_2S$ uptake as a function of treatment time by aqueous amine solutions.

FIG. 4 is a plot of the selectivity of $H_2S$ over $CO_2$ as a function of acid gas loading with different amine aqueous solutions. FIG. 5 is a plot of the $CO_2$ and $H_2S$ uptake as a function of treatment time by aqueous amine solutions.

The following conclusions are readily apparent from the plotted data of FIGS. 4 and 5. TBAEEM gives even higher selectivity towards $H_2S$ when compared with TBAEE, MDEA and M3ETB up to 0.34 mol/mol amine. Similarly to M3ETB selectivity and capacity decline as loading increases when this more concentrated solution is used: 2.17M vs. 1.50M.

EXAMPLE 3

Relative volatility

The volatility of M3ETB, TBAEEM and TBAEE was measured for 30 wt.-% aqueous solutions.

A glass condenser, which was operated at 5° C., was attached to a glass cylinder with a thermostated jacket. The glass cylinder was thermostated to 50° C., and 200 mL of the absorbent were introduced in each case. Over an experimental duration of 8 h, 30 NL/h of $N_2$ were passed through the absorbent at ambient pressure. Thereafter, the condensate obtained in the glass condenser was separated and analyzed for its composition by GC analysis and Karl-Fischer titration.

The results are shown in the following table:

| Solution | Amount of condensate [g] | Water [g/100 g] | Amine [g/100 g] |
|---|---|---|---|
| 30% M3ETB* | 30.1 | 99.2 | 0.7 |
| 30% TBAEE* | 30 | 99.3 | 0.7 |
| 30% MDEA* | 27.1 | 99.4 | 0.7 |
| 30% TBAEEM | 30.5 | 99.6 | 0.2 |

*comparative example

From the data above, it is readily apparent that volatility of TBAEEM is significantly lower compared to TBAEE and M3ETB.

EXAMPLE 4

Foam test

All foam tests are carried out at 25° C. 150 ml of 30 wt.-% aqueous amine solution was poured into a 500 ml graduated glass cylinder. Next, a spherical diffusor stone with a defined pore size was inserted into the solution. A constant nitrogen flow of 60 Nl/h was bubbled through the diffusor stone into the solution. After 5 minutes the diffusor stone was removed out of the cylinder. The total breakdown time (collapse time) of the foam was recorded. The experiments were performed in triplicate, the corresponding average collapse times are given in the table below.

|  | TBAEE | TBAEEM | TBAEM |
|---|---|---|---|
| collapse time [sec] | 32 | 23 | 23 |

Solutions having a collapse smaller than 30 sec can be considered as solutions having a low foaming tendency. Solutions with collapse time >30 sec have a strong foaming tendency. It can be seen that TBAEEM and TBAEM have a significant smaller foaming tendency compared to the reference example.

EXAMPLE 5

Sour gas loading capacity

Sour loading capacities of M3ETB, TBAEEM, TBAEM, TBAEE, MDEA, and Bis-MOE were measured for 30 wt.-% aqueous solutions.

A glass condenser, which was operated at 5° C., was attached to a glass cylinder with a thermostated jacket. This prevented distortion of the test results by partial evaporation of the absorbent. The glass cylinder was initially charged with about 100 mL of unladen absorbent (30% by weight of amine in water). To determine the absorption capacity, at ambient pressure and 40° C., 8 NL/h of $CO_2$ or $H_2S$ were passed through the absorption liquid via a frit over a period of about 4 h. Subsequently, the loading of $CO_2$ or $H_2S$ was determined as follows:

The determination of $H_2S$ was effected by titration with silver nitrate solution. For this purpose, the sample to be analyzed was weighed into an aqueous solution together with about 2% by weight of sodium acetate and about 3% by weight of ammonia. Subsequently, the $H_2S$ content was determined by a potentiometric turning point titration by means of silver nitrate. At the turning point, the $H_2S$ is fully bound as $Ag_2S$. The $CO_2$ content was determined as total inorganic carbon (TOC-V Series Shimadzu).

The laden solution was stripped by heating an identical apparatus setup to 80° C., introducing the laden absorbent and stripping it by means of an $N_2$ stream (8 NL/h). After 60 min, a sample was taken and the $CO_2$ or $H_2S$ loading of the absorbent was determined as described above.

The difference in the loading at the end of the loading experiment and the loading at the end of the stripping experiment gives the respective cyclic capacity.

The experimental results are summarized in the Table below:

| Run | Absorbent | $CO_2$ loading after loading ($mol_{CO2}/mol_{amine}$) | $CO_2$ loading after stripping ($mol_{CO2}/mol_{amine}$) | Cyclic Capacity ($mol_{CO2}/mol_{amine}$) |
|---|---|---|---|---|
| 1 | 30 wt.-% MDEA | 0.77 | 0.05 | 0.72 |
| 2 | 30 wt.-% TBAEE | 0.97 | 0.24 | 0.73 |
| 3 | 30 wt.-% M3ETB | 0.97 | 0.17 | 0.80 |
| 4 | 30 wt.-% TBAEEM | 1.04 | 0.01 | 1.03 |
| 5 | 30 wt.-% TBAEM | 0.93 | 0.03 | 0.90 |
| 6 | 30 wt.-% Bis-MOE | 0.25 | 0.02 | 0.23 |

| Run | Absorbent | $H_2S$ loading after loading ($mol_{H2S}/mol_{amine}$) | $H_2S$ loading after stripping ($mol_{H2S}/mol_{amine}$) | Cyclic Capacity ($mol_{H2S}/mol_{amine}$) |
|---|---|---|---|---|
| 7 | 30 wt.-% TBAEEM | 1.04 | 0.03 | 1.01 |
| 8 | 30 wt.-% Bis-MOE | 0.26 | 0.01 | 0.25 |

It can be seen that TBAEEM has a higher cyclic capacity for $CO_2$ compared to the reference amines MDEA, TBAEE, TBAEM, M3ETB and Bis-MOE. Further, it can be seen that TBAEEM has a higher cyclic capacity for $H_2S$ compared to Bis-MOE.

The invention claimed is:

1. A process for removing acid gases from a fluid stream, comprising contacting the fluid stream with an absorbent comprising a solution of a compound of the general formula (I)

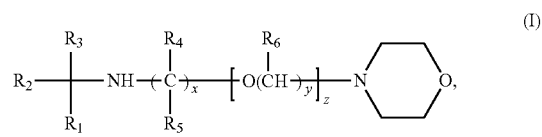

wherein $R_1$ and $R_2$ are independently $C_1$-$C_4$-alkyl; $R_3$ is selected from hydrogen and $C_1$-$C_4$-alkyl, $R_4$, $R_5$ and $R_6$ are independently selected from hydrogen and $C_1$-$C_4$-alkyl; x and y are independently integers from 2 to 4 and z is an integer from 1 to 3;
to obtain a treated fluid stream and a laden absorbent.

2. The process according to claim 1, wherein the compound of the general formula (I) is selected from the group consisting of N-[2(2-tert-butylaminoethoxy)ethyl]-morpholine and N-[2-(3-tert-butylaminopropoxy)ethyl]-morpholine, and combinations thereof.

3. The process according to claim 1, wherein the absorbent is an aqueous solution.

4. The process according to claim 3, wherein the absorbent comprises an acid.

5. The process according to claim 1, wherein the absorbent comprises an organic solvent.

6. The process according to claim 5, wherein the organic solvent is selected from the group consisting of $C_{4-10}$ alcohols, ketones, esters, lactones, amides, lactams, sulfones, sulfoxides, glycols, polyalkylene glycols, di- or mono ($C_{1-4}$-alkyl ether) glycols, di- or mono($C_{1-4}$-alkyl ether) polyalkylene glycols, cyclic ureas, thioalkanols and mixtures thereof.

7. The process according to claim 6, wherein the organic solvent is selected from the group consisting of sulfones, glycols, and polyalkylene glycols.

8. The process according to claim 1, wherein the absorbent comprises a tertiary amine or severely sterically hindered amine other than a compound of the general formula (I).

9. The process according to claim 8, wherein the tertiary amine is methyldiethanolamine or the severely sterically hindered amine is 2-(2-tert-butylaminoethoxy)ethanol.

10. The process according to claim 1 comprising selectively removing hydrogen sulfide from a fluid stream comprising carbon dioxide and hydrogen sulfide.

11. The process according to claim 1, wherein the laden absorbent is regenerated by means of at least one of the measures of heating, decompressing, and stripping with an inert fluid.

* * * * *